July 4, 1933. J. W. MATHEY 1,916,324
CLUTCH MECHANISM FOR PUNCH PRESSES
Filed June 29, 1932 3 Sheets-Sheet 3
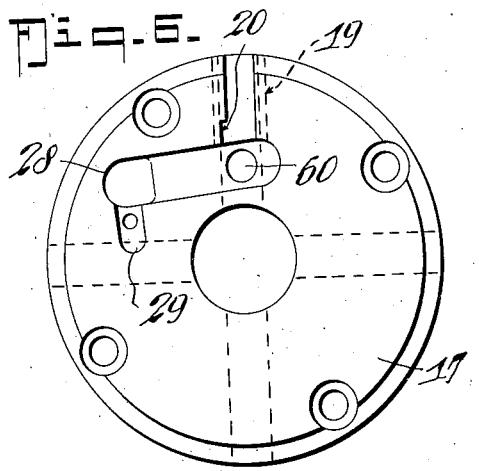
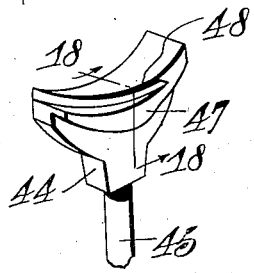
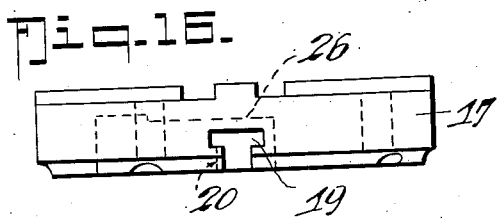
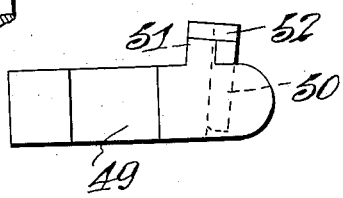
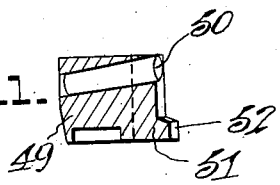
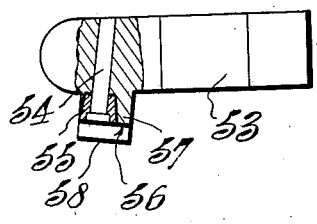
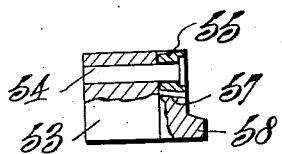
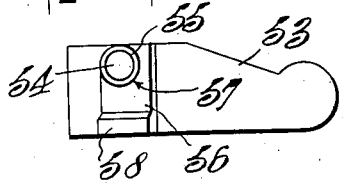
Inventor
Joseph W. Mathey.
By Albert R Dieterich
Attorney Patented July 4, 1933

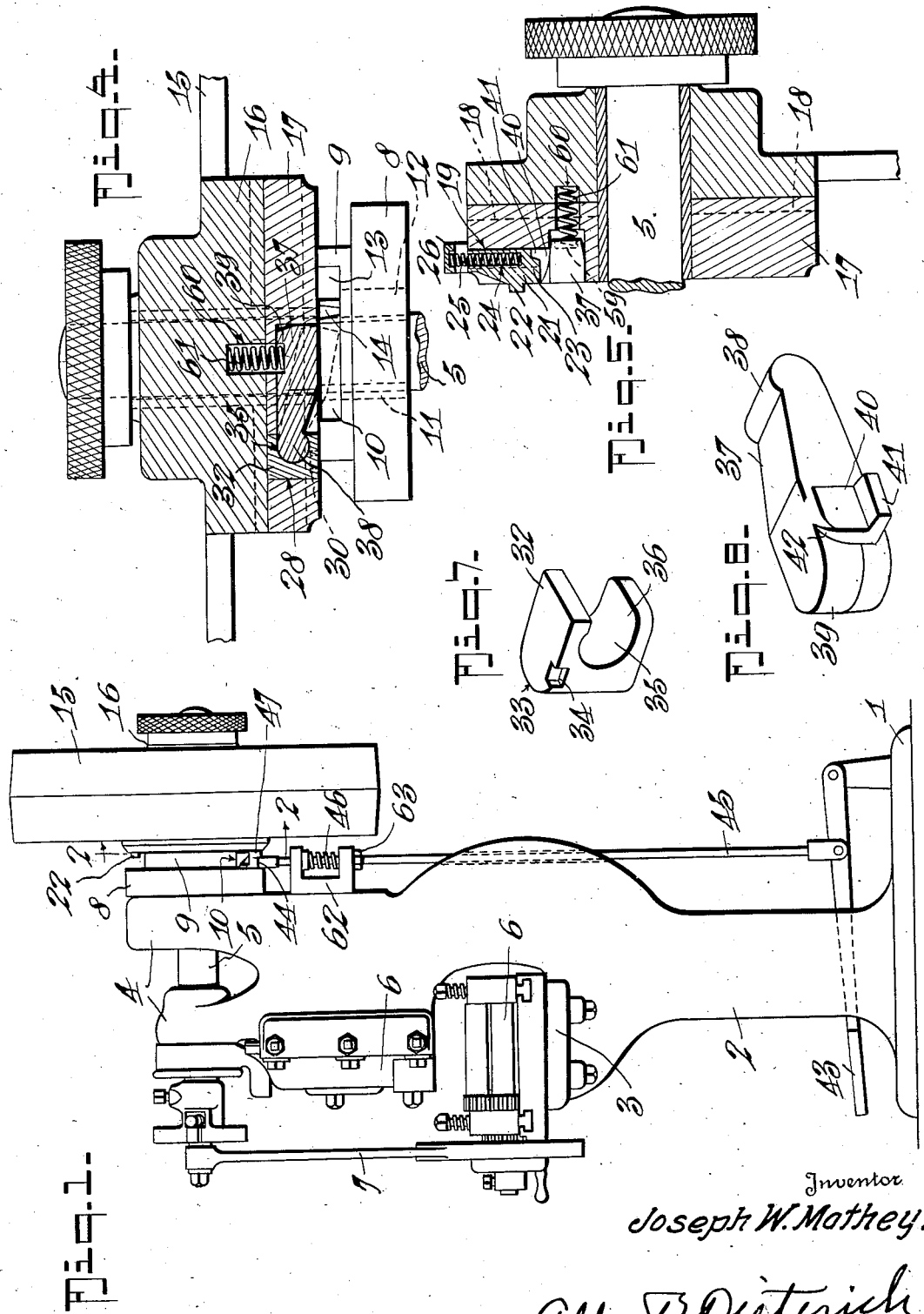

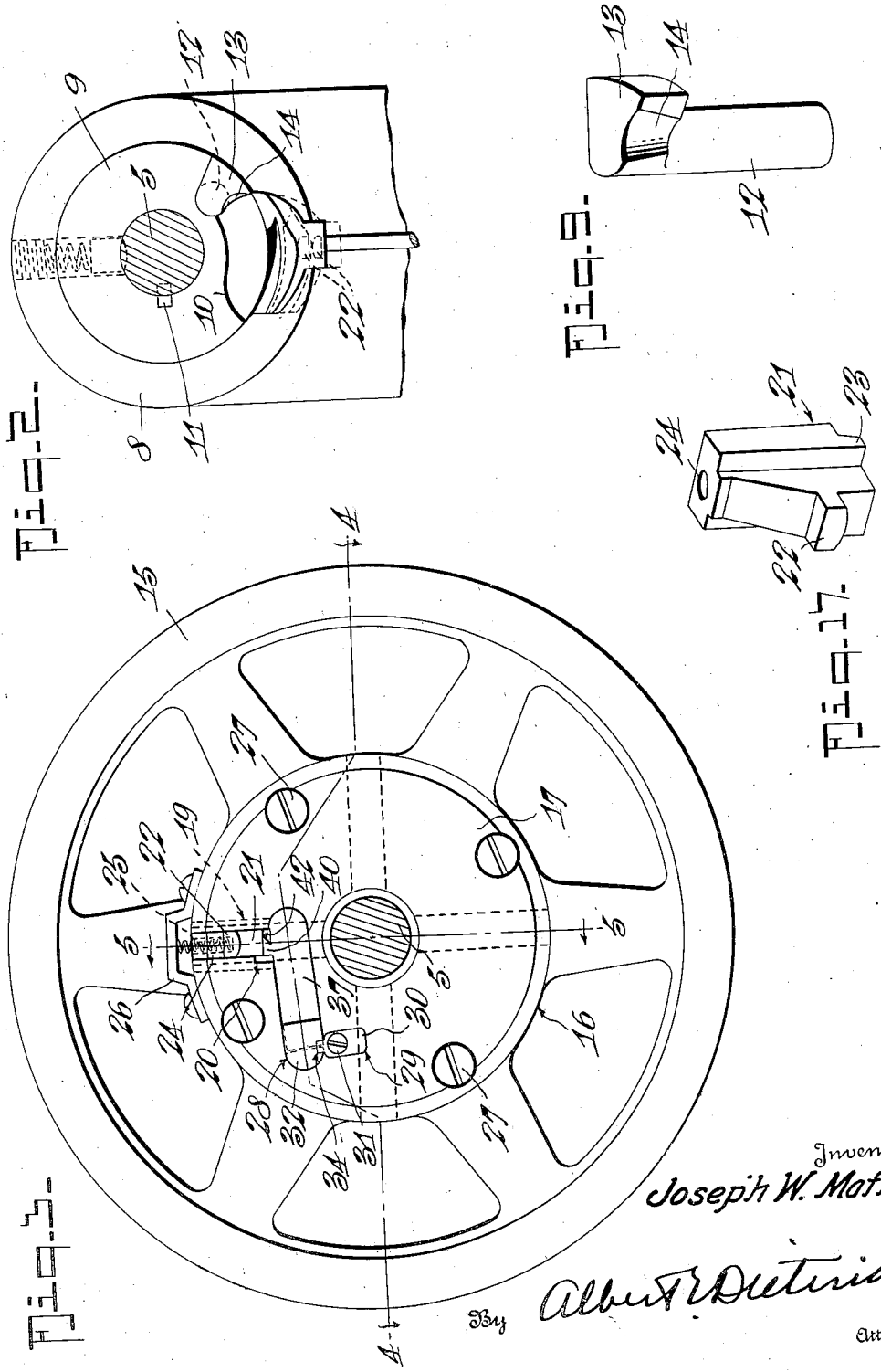

1,916,324

UNITED STATES PATENT OFFICE

JOSEPH W. MATHEY, OF STRUTHERS, OHIO

CLUTCH MECHANISM FOR PUNCH PRESSES

Application filed June 29, 1932. Serial No. 619,991.

My invention relates to power presses for cutting, stamping and punching articles from metal. Presses are now usually equipped with clutch mechanism whereby the press is caused to effect one cycle of operation and stop while the fly wheel continues its rotation at a more or less uniform speed.

Presses of the character for which my invention has been especially devised, comprise generally a base, a standard having bearings for a crank shaft which operates a movable die plunger, a fly wheel loose on the shaft to which driving power is applied either directly or indirectly from a suitable source, there being a clutch device provided for effecting a driving connection between the fly wheel and the crank shaft, which device includes a manually set clutch controlling means. The clutch devices in those presses now being used and for which my invention has been particularly designed, consist of a disk secured on the crank shaft and having a fixed abutment which is adapted to be engaged by a clutch bolt carried by the fly wheel and arranged to be shot into the path of the abutment when released, by means of a spring; there being a latch on the wheel for holding the bolt inwardly out of the path of the abutment when no driving connection is to be effected. Also there is provided a manually operated device which releases the latch so as to free the bolt and also for returning the bolt to the latched position at the will of the operator.

The bolts used in the machines with which I am familiar are set into pockets bored into the hub of the fly wheel to lie with their axes paralleling that of the crank shaft. Therefore, when the bolt is released the impact shock, as it engages the abutment, is at right angles to the axis of the bolt. This tends to widen the bolt hole and cause it to wear elliptical with the result that the bolt soon becomes loose in its hole and fails properly to function. Also the pressure of the driving force at the point of engagement between the bolt and the abutment being at right angles to the axis of the bolt causes the bolt to bind in its recess in the fly wheel, and when the bolt is to be retracted this binding force causes undue pressure and wear on the parts.

After a bolt hole has become so worn as to cause improper operation of the bolt it is customary to transfer the bolt and its latch to a new position in the hub. Hubs are now made with several bolt holes and latch recesses for this purpose (usually three bolt holes and latch recesses are provided). However, if all of the holes have become worn the fly wheel (an expensive item in the machine) must be discarded and a new one put on. It is to overcome the expense of replacing worn fly wheels that I have produced my invention.

Further, it is an object of my invention to provide means by which old fly wheels which have been discarded as above may again be put into use.

Further, it is an object to provide a mechanism which will leave the fly wheel hub without bolt holes, thereby reducing the chance of cracking to a minimum.

Further, it is an object to provide a mechanism whereby the life of the clutch unit is increased many times over present day practice.

Further, it is an object to provide a clutch device in which the function of the striking bolt is replaced by that of a dog which takes the impact longitudinally or lengthwise instead of transversely or sidewise as does the striking bolt heretofore used, thereby eliminating breakage with consequent stoppage of the machine and loss of time in production.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of a punch press embodying my invention, parts of the press not directly involved in the invention being more or less diagrammatically shown.

Figure 2 is a section on the line 2—2 of Figure 1 looking toward the standard.

Figure 3 is a cross section on the line 2—2 of Figure 1 looking toward the fly wheel.

Figure 4 is a cross section on the line 4—4 of Figure 2.

Figure 5 is a section on the line 5—5 of Figure 2.

Figure 6 is a face view of the fly wheel hub-attachment with the clutch dog and latch parts removed therefrom.

Figure 7 is a detail perspective view of the bearing block for the dog.

Figure 8 is a detail perspective view of one of the dogs that may be used as a part of my invention.

Figure 9 is a detail perspective view of the abutment pin.

Figure 10 is a detail view of a modified dog.

Figure 11 is a cross section through the wear pin of the modified dog.

Figure 12 is a side view of another modified dog.

Figure 13 is a face view of the same, parts being broken away.

Figure 14 is an end view of the same, parts being broken away.

Figure 15 is a detail perspective view of the saddle head.

Figure 16 is an end elevation of the fly wheel hub-attachment.

Figure 17 is a detail perspective view of the latch per se.

Figure 18 is a detail cross section on line 18—18 of Figure 15.

In the drawings in which like numerals of reference indicate like parts in all of the figures, 1 represents the base of the press on which is located the standard 2 that carries the bed 3, the bearings 4 for the crank shaft 5 and on which the ram 6 is mounted. The ram 6 is driven from the crank shaft by means of a pitman 7 or other suitable connection. All of the foregoing parts are of the conventional and well known construction.

Secured to the crank shaft is a disk 8 having a hub 9 that is provided with a recess 10 into which the driving member of the clutch mechanism may be projected. The disk 8 is secured to rotate with the crank shaft 5 in any suitable way as for example by means of a set screw or key 11.

Fitted into a recess in the hub 9 is an abutment pin 12 of hardened tool steel, the head 13 of which is provided with a seat 14 which is curved to fit the curvature of the end of the driving dog when that dog is in the driving position in order that a large contacting surface is effected between the driving end of the dog and the head of the abutment pin.

15 designates the fly wheel having a hub 16. This fly wheel turns loosely on the crank shaft and it is provided with radial slots 18 to enter corresponding keys in a hub-attachment 17 that also runs loose on the crank shaft but is secured to the hub 16 by suitable countersunk screws 27, or in any other suitable way but preferably in a manner that the hub-attachment may be removed or disconnected from the fly wheel when desired.

The hub-attachment 17 is provided with at least one radial T-slot 19 for a latch 21. A portion of the T-slot 19 is cut out as at 20 to permit movement of the lug 40 on the dog 37. 21 is a latch which operates in the slot 19 and has a retracting lug 22, the purpose of which will presently appear. It also has a dog-holding or latching shoulder 23 to cooperate with the latch engaging portion 41 of the dog 37 to hold the dog flush with the outer face of the hub-attachment at times.

The latch 21 is provided with a spring pocket 24 in which is a latch spring 25 that also engages a retaining member 26 suitably secured to the hub-attachment for the fly wheel.

The hub-attachment 17 is also provided with at least one dog and dog bearing block recess 28. This recess lies transversely of the T-slot 19. At least one key recess 29 is also provided adjacent to one end of the recess 28 and at right angles thereto for the reception of the dog bearing-block-retaining key 30, the key being secured in place by any suitable means as a screw 31 for example.

The dog bearing block 32 has a concave thrust end 33 and it also has a recess 34 to receive a lip of the key 30, thereby holding the block 32 in one end of the recess 28, the end remote from the T-slot. The block 32 has a concave dog-thrust bearing seat 35 and it also has a base projection 36 partly to underlie the bearing end of the dog 37. The dog 37 has a rocker bearing end 38 shaped to conform to the seat 35 and it also has an abutment pin head engaging end 39.

The dog is provided with a lug 40 that lies in the latch slot portion 20 and is provided with the latch engaging portion 41. The lug 40 is also provided with a dog resetting cam engaging portion 42 that is preferably undercut for a purpose presently understood.

The dog 37 is provided with a throw-out spring recess 59 and the hub-attachment is provided with a socket 60 to receive a throw-out spring 61, the purpose of which is to swing the dog outwardly to project into the recess 10 of the disk 8 when the latch is moved to release the dog.

The releasing and re-latching of the dog is effected by a mechanism under control of the operator. It consists of a pedal 43 connected by a rod 45 held in a suitable bearing bracket 62 that is secured to the standard 2 and carrying at its upper end a saddle 44. The saddle 44 has its upper face curved to conform to the curvature of the disk 8 and it is held upwardly into close proximity to the disk by means of a spring 46, a suitable adjusting nut 63 being provided to hold the saddle out of contact with the disk and thus prevent undue friction.

The saddle 44 is provided with a latch releasing cam 47 that cooperates with the lug 22 of the latch to move it radially outward and effect, thereby, its disengagement with the portion 41 of the lug 40, thereby permitting the thrust spring 61 to function.

The saddle 44 is also provided with a dog resetting cam 48 that is preferably undercut to cooperate with the undercut portion 42 of the dog to force the dog inwardly, thereby bringing it out of the recess 10 to disengage the abutment head 13 of the disk 8. The purpose of making the cam 48 undercut and providing the undercut portion 42 of the dog is in order to insure that the connection between the cam and the dog will be maintained while the dog is being latched even though the spring 46 should be weakened and not be sufficient to hold the saddle 44 close up to the disk 8.

In Figures 10 and 11 I have illustrated a modified construction of the dog, which in these figures is indicated by 49. In these figures the dog 49 is provided with the lug 51 having the latch engaging portion 52 and corresponds in purpose and function to the parts 40 and 41 respectively of the first described dog. The cam engaging portion 42 of the first described dog is, however, eliminated and in its place is put a hardened tool steel pin 50 that is driven into a hole provided in the dog for the purpose and fitting the hole with a tight engagement. The pin 50 is put in at such an angle as to provide in effect the same "undercut" as is provided at 42 on the first dog and for the same purpose.

In Figures 12, 13 and 14 I have shown another modification of the dog. In these figures the dog is indicated by 53. The pin 54 (correspondingly located to the pin 50 in the preceding embodiment of the dog) does not directly engage with the cam 48. In this modification of the dog the pin 54 carries a cam engaging roller 55 that is of frusto-conical form in order to provide the overhanging or undercut effect to correspond in purpose and function to 42 in the first described dog. The lug 56 of the dog 53 is provided with a recess 57 in which the roller 55 is located, the lug 56 having the latch engaging portion 58 corresponding in purpose and function to that portion 41 of the first described dog.

In the use of my invention where the invention is to be applied to old discarded fly wheels the hub of the old fly wheel is machined down to provide the necessary slots 18 to enter corresponding slots of the hub-attachment 17 and the hub-attachment is secured to the fly wheel as heretofore described.

When the parts are operating the flywheel is driven at a constant speed and is normally declutched from the crank shaft. When it is desired to effect an operation of the press the operator puts his foot on the pedal 43 to hold down the saddle 44 until the cam 47 shall have been engaged by the retracting lug 22 of the latch and the latch moved radially outward to release the dog 37. Whereupon the dog 37 is pressed by spring action toward the disk 8 and enters the recess 10 and whereupon the free end 39 of the dog engages the seat 14 of the abutment pin head and causes the crank shaft to turn. This turning action will continue so long as the operator keeps his foot on the pedal. When it is desired that the punch be operated through one cycle only the operator removes his foot from the pedal as soon as the dog has been released. Removing his foot from the pedal permits the saddle to be again projected toward the disk 8 so that as the dog comes around, the cam 48 will engage the portion 42 of the dog and force the dog inwardly, allowing the latch to spring back into latching position and hold the dog out of engagement with the disk 8, thereby stopping the rotation of the crank shaft.

It will be observed from the foregoing description, taken in connection with the accompanying drawings that the impact and driving thrust instead of being imparted transversely to the axis of a driving bolt as in previous practice, see for example the bolt (s) of Patent No. 369,970 to Stiles, September 13, 1887, has the impact and thrust imparted longitudinally to the dog and received by a large bearing surface 35 of the hardened steel back-up of thrust block 32 and by it transferred to a still larger contacting surface of the hub-attachment of the fly wheel. It is therefore impossible to break the dog (the ordinary clutch bolts heretofore in use being often broken off) and furthermore there is no danger of the dog wearing loose in its bearing in the hub-attachment. The fact that the bearing surfaces between the back-up block 33 and the wall of the hub-attachment recess are in the arc of a circle whose axis lies parallel to the axis of the hub-attachment and the fact that the free end of the dog and the corresponding contacting face of the abutment pin head are similarly curved allows the dog to find itself and straighten out the thrust should there be any slight mis-alignment of the parts for any reason.

It should be understood that while I have disclosed but one dog and latch or hub-attachment, it is obvious that the number of dogs and latches may be increased as desired and more than one set may be employed but as this would be a mere matter of duplication of parts illustration thereof is thought to be unnecessary.

From the foregoing description, taken in connection with the accompanying drawings, it is thought the complete construction, operation and advantages of my invention will be clear to those skilled in the art to which it relates.

What I claim is:

1. In a punch press wherein is provided a crank shaft and a fly wheel loose thereon; a clutch mechanism comprising a member secured to the shaft and having an abutment element, a dog carried by the fly wheel, means pivotally mounting said dog at one end to the fly wheel to move on an axis approximately at right angles to that of the fly wheel, a latch carried by the fly wheel to hold the dog in a non-active position, means operating upon release of the latch to move the free end of the dog into the path of said abutment element to engage the same, and operator controlled means to move the latch for releasing the dog and to effect a re-latching of the dog at will.

2. In a punch press wherein is provided a crank shaft and a fly wheel loose thereon; a clutch mechanism comprising a hub member carried by the fly wheel, an abutment pin carried by the crank shaft, a dog hingedly mounted in a recess in the hub member, a dog projecting spring, a dog hold-back latch, means to release the latch from the dog, and means to effect a re-latching of the dog.

3. In a punch press wherein is provided a crank shaft and a fly wheel loose thereon; a clutch mechanism comprising a hub member carried by the fly wheel, an abutment pin carried by the crank shaft, a dog hingedly mounted in a recess in the hub member, a dog projecting spring, a dog hold-back latch, means to release the latch from the dog, and means to effect a re-latching of the dog, said means being manually controlled.

4. In a press wherein is provided a shaft and a fly wheel loose thereon; a clutch mechanism comprising an abutment pin carried by the shaft and having a head with a concave seat, a hub element carried by the fly wheel and having a transversely elongated recess in a face thereof, a dog bearing block and a dog located in said recess, said dog having a convex bearing end and said block having a concave bearing seat for said end whereby said dog may rock on an axis transversely to that of the fly wheel and shaft, a latch in the hub element to hold the dog in the recess flush with said face, a dog projecting spring for forcing the free end of the dog outwardly when the latch is disengaged so that it may engage said abutment pin, and means to disengage said latch and to restore the dog to the latched position again at will.

5. In a press wherein is provided a shaft and a fly wheel loose thereon; a clutch mechanism comprising an abutment pin carried by the shaft, a hub element carried by the fly wheel and having a transversely elongated recess in a face thereof, a dog bearing block and a dog located in said recess, said dog having a convex bearing end and said block having a concave bearing seat for said end whereby said dog may rock on an axis transversely to that of the fly wheel and shaft, a latch in the hub element to hold the dog in the recess flush with said face, a dog projecting spring for forcing the free end of the dog outwardly when the latch is disengaged so that it may engage said abutment pin, and means to disengage said latch and to restore the dog to the latched position again at will, said means comprising a manually controlled saddle having a clutch engaging cam and a dog engaging cam for the purpose described.

6. In a press wherein is provided a shaft and a fly wheel loose thereon; a clutch mechanism comprising an abutment pin carried by the shaft, a hub element carried by the fly wheel and having a transversely elongated recess in a face thereof, a dog bearing block and a dog located in said recess, said dog having a convex bearing end and said block having a concave bearing seat for said end whereby said dog may rock on an axis transversely to that of the fly wheel and shaft, a latch in the hub element to hold the dog in the recess flush with said face, a dog projecting spring for forcing the free end of the dog outwardly when the latch is disengaged so that it may engage said abutment pin, and means to disengage said latch and to restore the dog to the latched position again at will, said means comprising a manually controlled saddle having a clutch engaging cam and a dog engaging cam, said dog having a cam portion to cooperate with the dog engaging cam of said saddle.

7. In a press wherein is provided a shaft and a fly wheel loose thereon; a clutch mechanism comprising an abutment pin carried by the shaft, a hub element carried by the fly wheel and having a transversely elongated recess in a face thereof, a dog bearing block and a dog located in said recess, said dog having a convex bearing end and said block having a concave bearing seat for said end whereby said dog may rock on an axis transversely to that of the fly wheel and shaft, a latch in the hub element to hold the dog in the recess flush with said face, a dog projecting spring for forcing the free end of the dog outwardly when the latch is disengaged so that it may engage said abutment pin, and means to disengage said latch and to restore the dog to the latched position again at will, said means comprising a manually controlled saddle having a clutch engaging cam and a dog engaging cam, said dog having a cam portion to cooperate with the dog engaging cam of said saddle, said cam and said cam portion being undercut to interlock while they are in their engaging positions.

8. In a press wherein is provided a shaft and a fly wheel loose thereon; a clutch mechanism comprising an abutment pin carried by the shaft, a hub element carried by the fly wheel and having a transversely elongated recess in a face thereof, a dog bearing block and a dog located in said recess, said dog having a convex bearing end and said block having a concave bearing seat for said end whereby said dog may rock on an axis transversely to that of the fly wheel and shaft, a latch in the hub element to hold the dog in the recess flush with said face, a dog projecting spring for forcing the free end of the dog outwardly when the latch is disengaged so that it may engage said abutment pin, and means to disengage said latch and to restore the dog to the latched position again at will, said means comprising a manually controlled saddle having a clutch engaging cam and a dog engaging cam, said dog having a cam portion to cooperate with the dog engaging cam of said saddle, said cam and said cam portion being undercut to interlock while they are in their engaging positions, said block having a rolling contact surface with the hub element under end thrust of the dog, the axis of which rolling contact surface is at right angles to the rocking axis of the dog in the block for the purposes specified.

9. In apparatus of the class described, a clutch dog comprising an elongated body having at one end a rolling bearing surface and at the other end having a thrust block engaging surface and a laterally projected lug adjacent thereto, said lug having a latch engageable portion and a portion for engaging with a dog resetting cam, said last named portion comprising a hardened pin immovably held in a hole in the dog.

10. In apparatus of the class described, a clutch dog comprising an elongated body having at one end a rolling bearing surface and at the other end having a thrust block engaging surface and a laterally projected lug adjacent thereto, said lug having a latch engageable portion and a portion for engaging with a dog resetting cam, said last named portion comprising a hardened pin immovably held in a hole in the dog, and a cam engaging roller on said pin.

11. In a punch press wherein is provided a crank shaft and a fly wheel thereon; the combination with the same of means for operatively connecting the fly wheel with the shaft to turn the same, said means including an abutment carried by the shaft, a driving dog and a dog latching device carried by the wheel, and cam devices for effecting the release of the dog to a driving position and for effecting a restoration of the dog to a latched position at will, said dog being so mounted on the fly wheel as to take the driving impact and thrust in the direction of its length.

12. In a punch press wherein is provided a crank shaft and a fly wheel thereon; the combination with the same of means for operatively connecting the fly wheel with the shaft to turn the same, said means including an abutment carried by the shaft, a driving dog and a dog latching device carried by the wheel, and cam devices for effecting the release of the dog to a driving position and for effecting a restoration of the dog to a latched position at will, said dog being so mounted on the fly wheel as to take the driving impact and thrust in the direction of its length, and a dog rocker bearing block carried by the fly wheel to which an end of the dog is pivotally connected.

13. In a punch press wherein is provided a crank shaft and a fly wheel thereon; the combination with the same of means for operatively connecting the fly wheel with the shaft to turn the same, said means including an abutment carried by the shaft, a driving dog and a dog latching device carried by the wheel, and cam devices for effecting the release of the dog to a driving position and for effecting a restoration of the dog to a latched position at will, said dog being so mounted on the fly wheel as to take the driving impact and thrust in the direction of its length, and a dog rocker bearing block carried by the fly wheel to which an end of the dog is pivotally connected, said block itself having a rocking engagement with the fly wheel for the purposes specified.

14. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog held in said elongated recess, a spring latch in said latch recess, a spring in said hub attachment for forcing the free end of the dog out of the recess when the latch is retracted, said latch and said dog having engaging portions, a manually set cam member having two cams one to retract the latch for releasing the dog and the other to press the dog into its latched position.

15. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position, a spring device continuously tending to hold said cam member in position to effect a restoration of the dog to its latched position.

16. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position, a spring device continuously tending to hold said cam member in position to effect a restoration of the dog to its latched position, said dog and its restoring cam having interlocking provisions to hold the parts together while the dog is being relatched.

17. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position, a spring device continuously tending to hold said cam member in position to effect a restoration of the dog to its latched position, said dog and its restoring cam having interlocking provisions to hold the parts together while the dog is being relatched, said interlocking provisions comprising an undercut cam surface on the cam member and an undercut member on the dog to cooperate therewith.

18. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog and dog thrust bearing block held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position.

19. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog and dog thrust bearing block held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position, a spring device continuously tending to hold said cam member in position to effect a restoration of the dog to its latched position, said dog and its restoring cam having interlocking provisions to hold the parts in proper relation while the dog is being re-latched.

20. In a punch press wherein is provided a crank shaft and a fly wheel loose thereon; an abutment member on the shaft, a hub-attachment removably secured to the fly wheel and bored to fit loosely on the crank shaft, said attachment having an elongated recess in its outer face and having a latch recess intersecting the same near one end, a dog and dog thrust bearing block held in said elongated recess, a spring latch in said latch recess, a spring in said hub-attachment for forcing the free end of the dog out of the recess when the latch is retracted, said latch and said dog having engaging portions, a manually set cam member having two cams one to retract the latch for releasing the dog and the other to press the dog into its latched position, a spring device continuously tending to hold said cam member in position to effect a restoration of the dog to its latched position, said dog and its restoring cam having interlocking provisions to hold the parts in proper relation while the dog is being re-latched, said interlocking provisions comprising undercut cam surfaces on said cam member and an inclined pin with a roller on said dog.

JOSEPH W. MATHEY.